United States Patent [19]

Zimmermann et al.

[11] Patent Number: 5,201,343

[45] Date of Patent: Apr. 13, 1993

[54] EXTENSIBLE HOUSE FOR REDUCING PRESSURE PULSES

[75] Inventors: Otto Zimmermann, Frankfurt am Main; Günter von Steht, Weinheim, both of Fed. Rep. of Germany

[73] Assignees: Ingenieurburo H. Luthin AG, Wettingen, Switzerland; Techno-Chemie Kessler & Co. GmbH, Karben, Fed. Rep. of Germany

[21] Appl. No.: 773,551

[22] PCT Filed: Feb. 5, 1991

[86] PCT No.: PCT/CH91/00028

§ 371 Date: Dec. 27, 1991

§ 102(e) Date: Dec. 27, 1991

[87] PCT Pub. No.: WO91/13790

PCT Pub. Date: Sep. 19, 1991

[30] Foreign Application Priority Data

Mar. 6, 1990 [CH] Switzerland ............... 711/90

[51] Int. Cl.$^5$ ............................... F16L 55/04
[52] U.S. Cl. ........................ 138/26; 138/30; 138/109; 138/113; 181/255
[58] Field of Search ......... 138/26, 30, 44, 42, 138/109, 111, 113, 114; 417/540; 181/212, 215, 247, 248, 255, 207, 196; 60/327, 489

[56] References Cited

U.S. PATENT DOCUMENTS

| | | | |
|---|---|---|---|
| 2,548,965 | 4/1951 | Gaugler | 181/233 |
| 2,646,039 | 7/1953 | Agosti | 138/26 |
| 3,165,123 | 1/1965 | Hawkins | 138/26 |
| 3,323,305 | 6/1967 | Klees | 181/207 |
| 3,908,788 | 9/1975 | Hammarstedt | 181/233 |
| 4,243,073 | 1/1981 | Hugley | 138/26 |
| 4,611,633 | 9/1986 | Buchholz et al. | 138/26 |
| 4,671,380 | 6/1987 | Henderson et al. | 181/233 |
| 5,094,271 | 3/1992 | Fritz et al. | 138/26 |

FOREIGN PATENT DOCUMENTS 3809310 10/1988 Fed. Rep. of Germany ........ 138/26

Primary Examiner—James E. Bryant, III
Attorney, Agent, or Firm—Nies, Kurz, Bergert & Tamburro

[57] ABSTRACT

An expansion hose for power steering plants of motor vehicles. The hose includes an outer pressure hose (2) connected to an inlet side end member (1) and to an outlet side end member (3). An inner flexible hollow body (5) is arranged coaxially with pressure hose 2, and which at the inlet side is connected to a nipple plug (4) of the inlet side end member (1) and at the outlet side extends freely into the outlet side end member (3) in its outlet channel (6) with a radial clearance. The nipple plug (4) includes in addition to the axial passage (9) located at the center axial passages (10) at a radial distance outwardly therefrom and distributed circumferentially, and which lead into the annular space (8) between the outer pressure hose (2) and the inner flexible hollow body (5). A part (4a) of the nipple plug (4) formed as a hexagonal body and is pressed into the inlet side end member (1), whereby the passages (10), arranged on a circle, are formed through which the pressurized medium flows throttled into the annular space (8), into which annular space also lead a plurality of spaced radial passage openings (7) arranged distributed along the inner flexible hollow body (5).

7 Claims, 3 Drawing Sheets

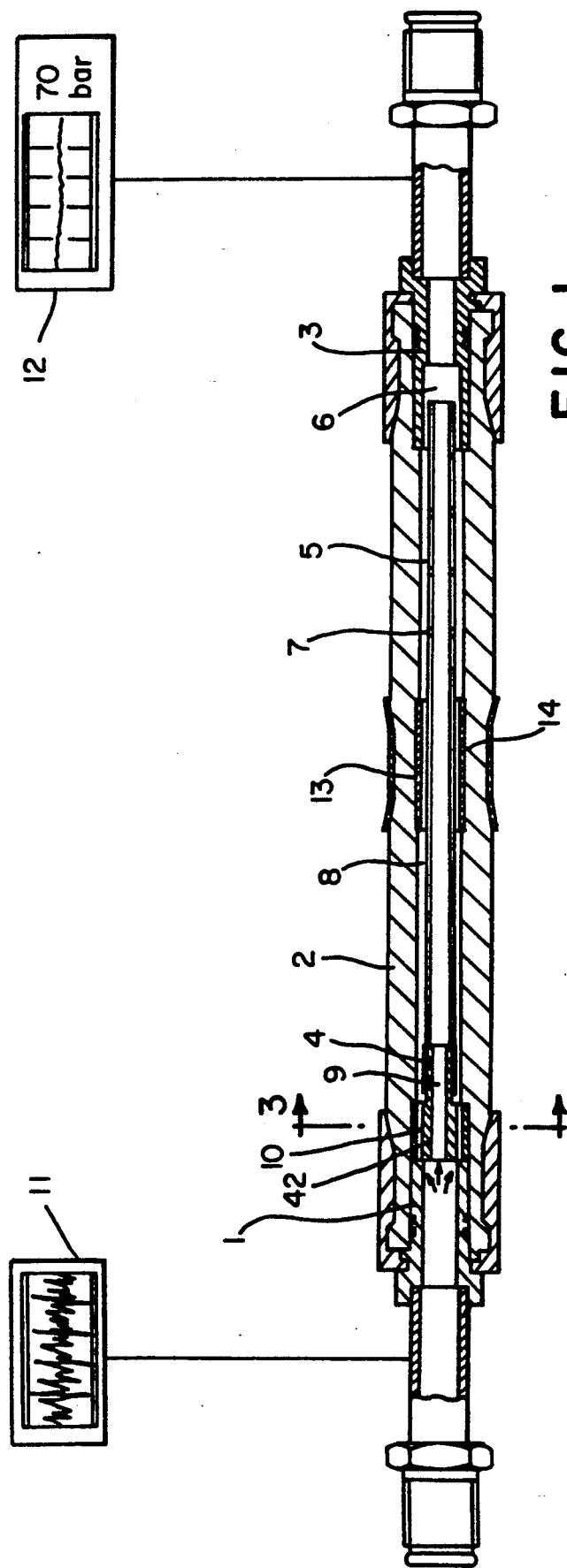
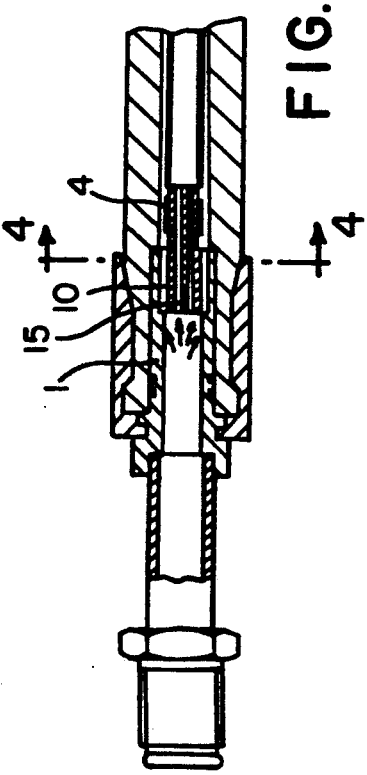

EXTENSIBLE HOUSE FOR REDUCING PRESSURE PULSES

BACKGROUND OF THE INVENTION

1. Field of the Invention

The invention relates to an expansion hose for reducing the pressure pulsations and sounds associated therewith in hydraulic systems caused by the pump. Expansion hoses of this kind are used in power steering plants of motor vehicles in which the pressure hose reacts at varying operational pressures by a change of the volume of the hose by expansion and reduces thereby the pressure pulsations and the sounds originating from the pump. This reduction of the pressure pulsations and sounds depends upon the length, the cross-section and the expansion of the volume of the expansion hose. Because, however, the space available for the installation of the pressure hose is limited in a motor vehicle, it is not possible to arbitrarily select its dimensions and the result achieved is not satisfactory in many cases.

2. Description of the Related Art

In order to arrive at better results it has already become known to arrange a further inner flexible hose in an outer expansion hose. The inner flexible hose is connected at one end to the inlet side end member and ends freely with its other open end in the outer expansion hose. This may lead, however, due to the positions of the two hoses not being controllable, to damage at the inner side of the outer expansion hose which may be the cause for a defect that is not immediately recognizable. In order to achieve a further improvement, it is furthermore also known to additionally provide about at the center of the outer expansion hose a throttle member having an axial throttle through passage and which divides the outer expansion hose into two hose chambers interconnected by the throttling through passage, whereby the inner hose includes radial passages at the location of the first inlet side hose chamber. The flow resistance in the inner hose leads to a phase shift between the two hydraulic flows in the inlet side hose chamber and also due to the reverse flow of the pressurized medium from the steering side into the outlet side hose chamber, as a result of which a pulsation and sound is achieved.

The above mentioned known variants of solutions, however, do not always lead to the desired object to satisfy the highest demands regarding comfort with regard to the attenuation of sound and reduction of pulsations in a vehicle.

It is thus an object of the invention to provide an improved expansion hose for a pressurized hydraulic system such that pressure pulsations produced by the pump cannot be sensed as sound in extreme cases. It has been recognized that dividing the pressurized medium at the inlet side into a flow portion entering the annular space between the outer pressure hose and the inner hollow body and into a further flow portion entering directly into the inner hollow body, in combination with the further feature of the inner hollow body extending into the outlet side end member leads to specifically good results. According to a further preferred embodiment the outer pressure hose can be equipped additionally with an already known throttling member having axial throttle passages by means of which the pressure hose is subdivided into chambers.

BRIEF DESCRIPTION OF THE DRAWINGS

An embodiment of the subject matter of the invention will be explained hereinafter in detail based on the drawings. In these drawings illustrates:

FIG. 1 a longitudinal section through a first embodiment of the expansion hose;

FIG. 2 a relative to the inlet side end member modified embodiment of an expansion hose, shown broken off.

DESCRIPTION OF THE PREFERRED EMBODIMENTS

Figure 4:
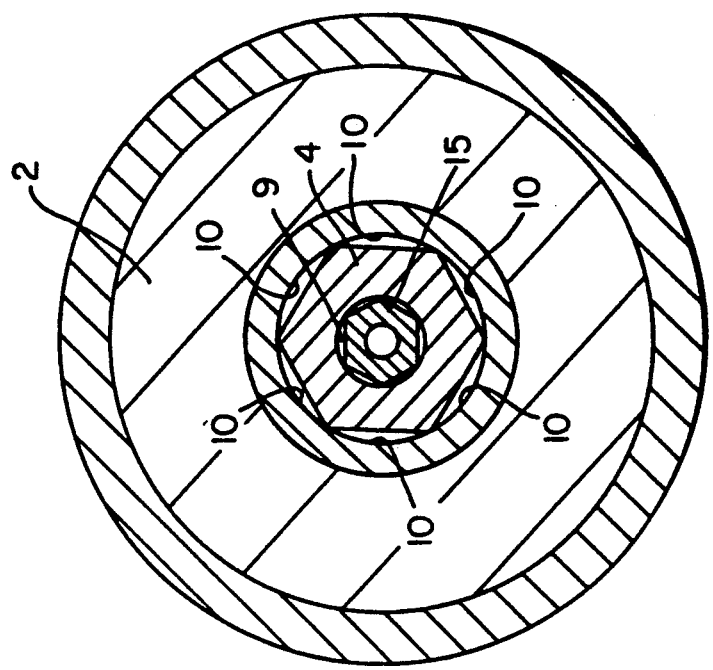
FIG. 4 is a cross-sectional view taken along the line 4—4 of FIG. 2.
Figure 3:
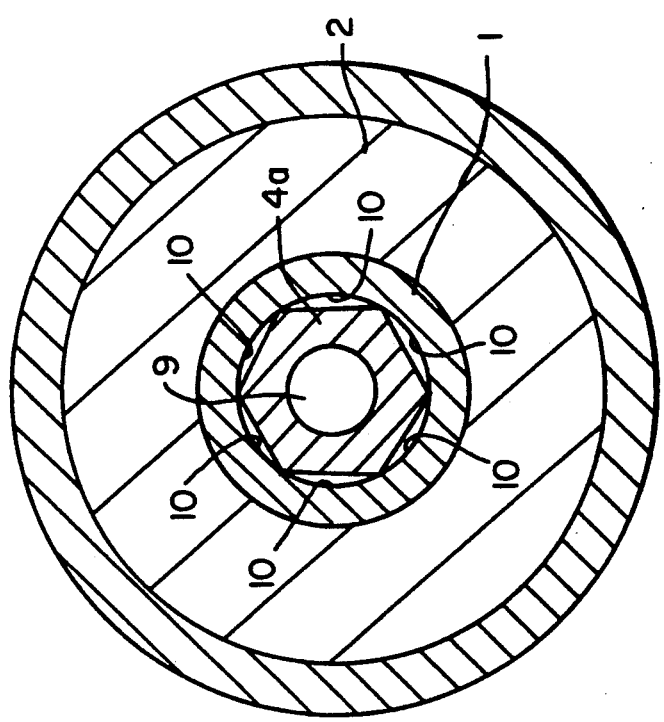
FIG. 3 is a cross-sectional view taken along the line 3—3 of FIG. 1.

At the expansion hose according to FIG. 1 an outer pressure hose 2 is connected to an inlet side end member 1, having a high lateral volume expansion. Hose 2 is fixedly connected at its other end to an outlet side end member 3. The inlet side end member 1 is furthermore fixedly connected to a nipple plug 4, to which an inner flexible hollow body 5 is in turn connected. Hollow body 5 extends through the outer pressure hose 2 coaxially therewith and may be a flexible tube, or a hose, or a helically wound strand of material. This flexible hollow body 5 includes an end portion that extends freely into the outlet channel 6 of the outlet side end member. The outer diameter of hollow body 5 is smaller than the outlet channel 6 enclosing same, whereby an annular gap is present between these parts. The inner flexible hollow body 5 also includes radial passage openings 7 arranged tube distributed at axial distances along its entire length through which the pressurized medium reaches the annular space 8 between the outer pressure hose 2 and the inner flexible hollow body 5.

The nipple plug 4 includes at its center an axial passage 9 through which the pressurized medium flows into the inner flexible hollow body 5. The forward part 4a of the nipple plug 4 is designed as a hexagonal body which is pressed into a cylindrical bore of the inlet side end member 1. Consequently, a plurality of passages 10 are formed between this bore and the flat portions of the outer circumference of the hexagonal body, which flat portions are uniformly distributed along the circumference, and through which passages the pressurized medium flows throttled into the annular space 8 between the outer pressure hose 2 and the inner flexible hollow body 5. The combination of the above described features, namely the passages 10 into the annular space 8 acting as throttle, the radial passage openings 7 into the annular space 8 present in the flexible hollow body 5 and the inner flexible body 5 extending into the outlet channel 6 of the outlet side end member 3, leads to an excellent result regarding the reduction of the pressure pulsations and generation of noise, which is shown in FIG. 1 by two graphic illustrations 11 and 12 at the inlet side and the outlet side of the expansion hose, respectively, and which display a strongly oscillating pressure line at the inlet side and a substantially equalized pressure line at the outlet side at an operating pressure of 70 bar.

According to a preferred embodiment, the expansion hose according to FIG. 1 includes at about the midpoint of its length an additional throttling member 13 having an axial throttling passage 14, by means of which the pressurized medium flows throttled from a first chamber into a second chamber inside the expansion hose, which is divided by the throttling member into the two chambers.

According to a modified embodiment according to FIG. 2, the pressurized medium is additionally throttled at the inlet side in that a further hexagonal body 15 is pressed into the axial bore 9 of the nipple plug 4 as a result of which a plurality of axial passages are formed distributed uniformly relative to the circumference of hexagonal body 15.

Figure 5:
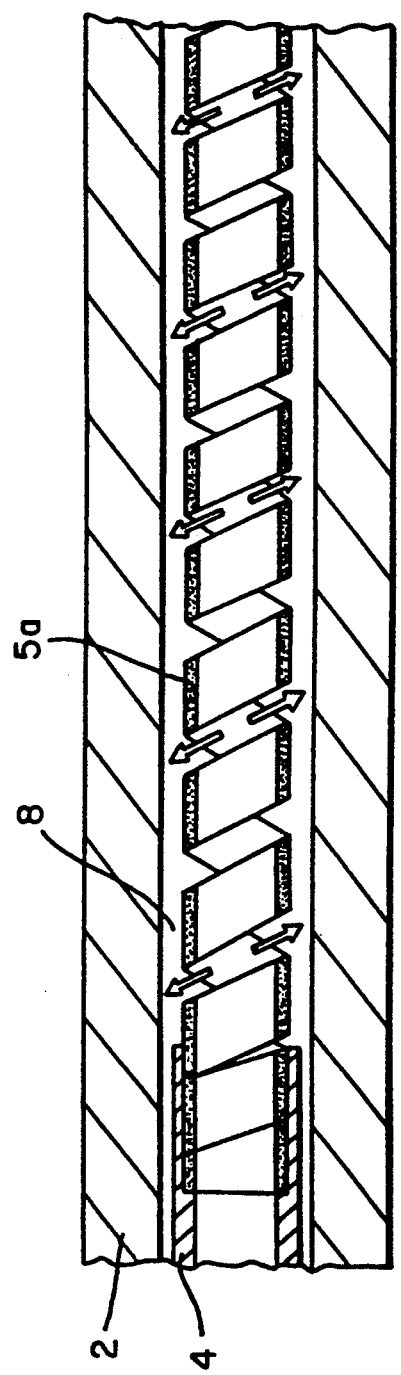
FIG. 5 is a fragmentary, side view showing an inner flexible hollow body formed from a helically wound strand of material.

According to a modified embodiment according to FIG. 5, the inner, flexible, hollow body 5a consists of a helically wound strand of material having a pressure dependent dilation of length capability in order to vary the magnitude of the gap between the windings of the strand of material.

What is claimed is:

1. An expansion hose for reducing the pressure pulsations and sounds associated therewith in hydraulic systems caused by a pump, specifically for power steering plants of automotive vehicles, said expansion hose comprising: an outer pressure hose connected to an inlet side end member and to an outlet side end member, an inner flexible hollow body arranged coaxially within the outer pressure hose to define an annular space between the inner flexible hollow body and the outer pressure hose, the inner flexible hollow body serving for conducting a pressurized medium and having at an inlet end and an outlet end, a nipple plug carried at the inlet end of the inner flexible hollow body, wherein the nipple plug includes a first axial passage providing communication between the inlet side end member and the interior of the inner flexible hollow body, and wherein a second axial passage providing communication between the inlet side end member and the annular space between the inner flexible hollow body and the outer pressure hose is defined between an outer surface of the nipple plug and an inner surface of the inlet side end member, and wherein the outlet end of the inner flexible hollow body extends freely into the outlet side end member, and wherein the outer diameter of the inner flexible hollow body at the outlet end is smaller than the inner diameter of the surrounding outlet side end member.

2. The expansion hose of claim 1, wherein the nipple plug defines a throttling member in the form of the first axial passage extending into the inner hollow body, and the second axial passage includes a plurality of openings to the annular space between the outer pressure hose and the inner hollow body, the plurality of openings distributed uniformly about the circumference of the nipple plug and located at a radial distance from the nipple plug center axis.

3. The expansion hose of claim 2, wherein the nipple plug has an outer surface that is hexagonal in cross section, and the hexagonal outer surface is pressed into a bore of the inlet side end member.

4. The expansion hose of claim 3, including a second body having an outer surface that is hexagonal in cross section, wherein the second body is pressed into the first axial passage of the nipple plug to form a plurality of third axial passages that communicate with the interior of the inner flexible hollow body.

5. The expansion hose of claim 1, wherein the inner flexible hollow body is a flexible tube having a plurality of radially extending openings distributed along its longitudinal extent.

6. The expansion hose of claim 1, wherein the inner flexible hollow body is formed from a helically wound strand of material having a pressure dependent dilation of length capability in order to vary the magnitude of the gap between the windings of the strand of a material.

7. The expansion hose of claim 1, wherein the outer pressure hose includes at least one throttling member defining at least one axial throttling passage that divides the pressure hose into a plurality of chambers.

* * * * *